United States Patent Office 2,954,276
Patented Sept. 27, 1960

2,954,276

HYDROMETALLURGICAL PROCESS

Wayne C. Hazen, Boulder, Colo., assignor to Kerr-McGee Oil Industries, Inc., a corporation of Delaware No Drawing. Filed Jan. 23, 1957, Ser. No. 635,576

20 Claims. (Cl. 23—125)

This invention relates to the recovery of metal values from aqueous solutions and more particularly to the absorption of metals in the form of simple cations from natural sources such as mine waters or other acidic aqueous solutions by means of water insoluble, solid, weak base amine resins. In one of its more specific embodiments, the present invention relates to the recovery of cobalt, nickel, copper, and zinc from their aqueous solutions by a process comprising absorption of the same by water insoluble, solid, weak base amine resin.

The recovery of metal values from very dilute aqueous solutions is generally considered to be uneconomic even though it may be accomplished in some instances. Few processes are known, such as the cementation process for the recovery of copper, whereby metal values may be economically recovered from very dilute solutions. For example, a method was not known heretofore for readily and economically recovering cobalt, nickel or zinc from their dilute solutions.

When it is considered that dilute solutions of cobalt, nickel, copper and zinc occur naturally and in large volume, such as in mine waters, it will be apparent that methods are needed for economically recovering these metals from dilute solution. The cementation process for the recovery of copper has a number of disadvantages in actual operation and also is frequently uneconomic due, in part, to wide fluctuations in the price of the reductor metal, such as scrap iron, aluminum, etc.

I have discovered that the water insoluble, solid, weak base amines, when properly used in accordance with the process of the invention, are capable of absorbing and thus concentrating the cations of cobalt, nickel, copper, and zinc from even their highly dilute solutions. The process to be described hereinafter provides for the economic absorption of these metal cations from their solutions, i.e., leach liquors obtained from their ores, as a concentrate which may be further processed to produce a metal which is present in the concentrate.

It is an object of the present invention to provide a novel process for the absorption and concentration of the cations of cobalt, nickel, copper and zinc.

It is still a further object of the present invention to provide a novel process for absorbing the cations of cobalt, nickel, copper and zinc from their aqueous solutions by means of a water insoluble, solid weak base amine resin.

It is a further object of the present invention to provide a novel process for the absorption of the cations of cobalt, nickel, copper and zinc from their dilute solutions as a metal amine complex and to prepare a metal concentrate therefrom.

Still other objects of the present invention and the advantages thereof will be apparent to those skilled in the art by reference to the following detailed description and the examples.

Broadly stated, the present invention comprises absorbing the cations of cobalt, nickel, copper and zinc from their acidic solutions by contacting the solution with a water insoluble, solid, weak base amine resin. The solution is maintianed at a pH of at least about 3.0 but less than that pH at which a metal ion is precipitated therefrom as the metal hydroxide or basic salt. When cupric ion is present in solution, it is apparently absorbed by the weak base amine resin as a cupric amine complex since weak base amine resins are normally anion collectors. The copper content may then be stripped from the copper loaded weak base amine resin, if desired, by contacting the same with a mineral acid stripping solution, thereby regenerating the weak base amine resin and producing a concentrate of copper in the stripping solution. Metallic copper may be readily obtained from the stripping solution by electrolysis or other suitable known methods.

If the solution contains one or some of the metals consisting of cobalt, nickel, copper and zinc, these simple cations can be absorbed and stripped from the weak base amine resin in the same manner as illustrated with copper. Then the strip solution which is a concentrate of the metal cations may be treated further by methods known to the art, such as for example, electrolysis, to obtain the desired metallic metal.

Among the water-insoluble, solid, weak base amine resins suitable for use in the present invention, there may be mentioned the well known weak base anion exchange resins which are available commercially under various trade names.

In general, the nature of ion-exchange materials and their mode of preparation is well known and described in the literature. For example, the chapter on "Ion Exchange" at volume 8, pages 1 to 17 in the Encyclopedia of Chemical Technology, 1952 edition by Kirk-Othmer, Interscience Encyclopedia and pages 62, 63 and 388 of the book on "Ion Exchange," edited by F. C. Nachod in 1949, Academic Press, Inc., New York, N. Y., are specifically referred to as providing part of the disclosure of the nature and mode of preparation of ion-exchange materials in general as well as various commercial and trade-named ion exchange materials.

Specifically, the Amberlite IR–45 anion exchange resins are described by their makers as being weakly basic in nature and characterized by extraordinary stability at elevated temperatures and resistant to chemical and physical attrition. Further, the sales literature of the manufacturer of Amberlite IR–45 states it may be expected to behave in a manner similar to that of an aliphatic amine such as di-n-propylamine except, of course, insofar as Amberlite IR–45 is insoluble in water and all other common solvents. Amberlite IR–45 is of the polystyrene base polyamine type.

Amberlite IR–4B is said to be of the weakly basic phenol formaldehyde polyamine type.

In general, the hydrocarbon radicals on the amine groups of the weakly basic anion exchange resins, i.e., those hydrocarbon radicals other than the ones present as part of the polymer chain, are short and non-branched as the longer hydrocarbon radicals and branched chains produce considerable steric hindrance.

One of the better known methods of making weak base anion exchange resins comprises chloromethylating polystyrene and then reacting the chloromethylated product with a primary or secondary amine to obtain the class of anion exchange materials known as weak base anion resins or weak base amine resins. The aminated polystyrenes obtained by the amination of a chloromethylated polystyrene will actually contain di and tri substituted amine groups. If a tri-substituted amine is used instead of the primary or secondary amine, then a strong base amine resin, i.e., a quaternary amine is obtained. The strong base amine resins are incapable of effectively absorbing the cations of cobalt, nickel, copper and zinc and are not satisfactory for the purposes of the present invention.

It has been found, unexpectedly, that anion exchange resins may be used to recover cations from solution. Heretofore, it was thought that anion exchange resins were capable of removing only anions from solution, but it has been discovered that certain anion exchange resins such as the weak base amine resins are also capable of removing certain cations from solution, i.e., those cations which are capable of forming ammonium complexes. The weak base anion exchange resins which are capable of forming pseudo-ammonium complexes with the cations of cobalt, nickel, copper and zinc are suitable for the purposes of the invention.

It has been further discovered that those anion exchange resins which are capable of removing cations from solution may be stripped of absorbed cations to thereby regenerate the anion exchange resin. The anion exchange resins for use in practicing the invention may be termed anion exchange resins of the pseudo-ammonium complex forming type which are capable of absorbing cations of the ammonium complex forming type. Such anion exchange resins may be made to function as a cation exchange resin for these particular cations.

The pH of the acidic aqueous solution must be maintained at a pH at least about 3 if an appreciable quantity of the cations of cobalt, nickel, copper and zinc are to be absorbed by a given quantity of the weak base amine resin, and the pH preferably must be less than that pH at which the metals are precipitated as the hydroxides or some of the metal values will be lost and the fouling of resin accelerated. It has been found in practice that the effluent from the column is more acidic than the charge thereto, so as a practical matter it is necessary to take this fact into consideration in adjusting the pH of the aqueous solution either before its entry to the absorption system or prior to its exit therefrom.

It is apparent that the maximum pH will vary somewhat with the different aqueous solutions but generally when the pH is higher than about 5.5–6.0, depending upon the concentration of the cations of cobalt, nickel, copper and zinc present in the solution as well as other ions, a metal will begin to precipitate and interfere with the efficient operation of the process of this invention. The preferred pH range is generally from about 5 to slightly over the pH at which a metal present begins to precipitate as the metal hydroxide or basic salt.

The temperature of the metal containing acidic aqueous solution during the absorption step is generally maintained at any suitable ambient temperature, such as 70° F. The concentration of aqueous mineral acid used in stripping the absorbed metal values from the weak base amine resin may vary over a considerable range depending upon the nature of the particular mineral acid used and the specific amine resin. The primary consideration is that the particular mineral acid should not be of a strength sufficient to harm the regenerated weak base amine resin which is to be recycled following the stripping step. However, a more concentrated mineral acid solution will provide a more concentrated metal concentrate in the stripping solution, while a more dilute acid yields a more dilute concentrate. Generally, a solution of 5–15% sulfuric acid is preferred for stripping most weak base amine resins. The oxidizing mineral acids such as nitric acid will destroy the resins if the concentration and temperature are too high, while phosphoric acid will tend to foul the resins by precipitating the anions of the metallic heterpoly type, such as titanates.

The following specific examples further illustrate the process of the present invention.

EXAMPLE I

A solution of copper sulfate containing 0.5 g./l. of copper was adjusted to a pH of 5.0 with NaOH and agitated in intimate contact with 1 gram of one of the commercial anion exchange resins listed in Table I for a period of 1 hour. The resins were in the hydroxide form when brought into contact with the copper sulfate solution. Upon expiration of the 1 hour contact period, the resin was removed from the solution, washed with distilled water and then stripped with 20 cc. of 5% sulfuric acid. It was observed that where copper was absorbed on the resin, it turned brilliant blue in color and became colorless upon stripping. The strip solution was analyzed for copper and the results are shown below as milligrams of copper absorbed per gram of resin. It will be noted that while weak base anion exchange resins containing primary, or secondary, or tertiary amine groups are suitable for the purposes of the present invention, the strong base anion exchange resins containing only quaternary amine groups are not suitable.

*Table I*

| Anion Exchange Resin | Manufacturer | Type | Copper Absorbed |
|---|---|---|---|
| Duolite A-2 | Chemical Process Corp. | Weak base containing primary, secondary and tertiary amine groups. | 15 |
| Duolite A-5 | do | Weak base-general purpose anion exchange. | 12 |
| Amberlite IR-4B | Rohm and Haas Co. | Weak base | 14 |
| Duolite A-6 | Chemical Process Corp. | do | 14 |
| Dowex | Dow Chemical Co. | Strong base (quaternary amine groups). | 0 |

EXAMPLE II

For the purpose of demonstrating that the absorption of cations of copper by weak base anion exchange resin is not the normal ion exchange reaction, the rate of absorption of copper on Amberlite IR-45 (weak base anion exchange resin marketed by Rohm and Haas Co.) was determined. The resin (5 grams) was intimately contacted with a copper solution at a pH of 4.5 for various periods of time and then the absorbed copper was recovered and analyzed. The copper absorbed (milligrams of copper per gram of resin) is as follows for the contact time indicated:

Time in minutes:           Copper absorbed
    10 _____ 30
    30 _____ 85
    60 _____ 100
    120 _____ 150

EXAMPLE III

A series of four identical columns were packed with a weak base anion exchange resin (IR-45) and the columns numbered as columns 1, 2, 3 and 4. Then four dilute solutions of cupric ion identical in every respect were prepared and the pH value of the solutions adjusted with sulfuric acid as follows:

Cupric Solution No.:                  pH
    1 _____ 3.00
    2 _____ 3.85
    3 _____ 4.05
    4 _____ 5.10

Cupric solution No. 1 having a pH of 3.00 was then passed through ion exchange column 1 until breakthrough of cupric ion was detected, which indicated that the resin was loaded with copper. This step was repeated using cupric solution No. 2 and column No. 2, etc., for the remaining three solutions and columns. The four ion exchange columns now containing copper-loaded weak base anion exchange resin were eluted with 10% sulfuric acid solution and the respective eluants analyzed for the purpose of determining milligrams of copper absorbed per gram of weak base anion exchange resin from cupric solution at the various pH values. Table II illustrates the effect of pH on the absorption efficiency of anion exchange resin.

Table II

| Column No. | Cupric Solution No. | pH | Copper Absorbed per gram of anion exchange resin, mg. |
| --- | --- | --- | --- |
| 1 | 1 | 3.0 | 8.0 |
| 2 | 2 | 3.85 | 19.4 |
| 3 | 3 | 4.05 | 20.2 |
| 4 | 4 | 5.10 | 25.0 |

It was found that when the pH was higher than about 5.5–6.0 a hydroxide precipitate began to form which interfered with the absorption process. Therefore, it is apparent that the preferred pH range is a pH of about 5.0 but less than that pH at which a hydroxide or basic salt precipitate begins to form, i.e., about 5.5–6.0.

EXAMPLE IV

A green solution of nickel sulfate containing 1.5 grams of nickel per liter and having a pH of 1.5 was adjusted to a pH of 5.0 with caustic, and then the nickel sulfate solution was intimately contacted with 100 grams of Duolite A–2 anion exchange resin over a period of six hours. The pH of the aqueous solution decreased as the nickel was absorbed and sufficient caustic was added to maintain the pH at about 5.0 during the absorption step. The nickel loaded resin was removed from the aqueous solution, washed and regenerated with a small volume of 10% sulfuric acid. The strip solution analyzed 10 grams of nickel per liter. The concentration of nickel in the strip solution was about 7 times that of the original solution.

EXAMPLE V

A liter of cobalt sulfate solution (0.3 gram of cobalt per liter) having a pH of 5.0 was slowly percolated through a column packed with the sulfate form of Amberlite IR–4B weak base anion exchange resin. The first portions of effluent were colorless and more acidic than the feed to the column. The column was shut in and backwashed with water when the effluent from the column began to retain the color of the charge to the column, thereby indicating incomplete absorption. The cobalt loaded resin was regenerated by eluting the column with dilute sulfuric acid. The eluant analyzed 1.5 grams of nickel per liter and it was determined that about 95% of the cobalt content of the original solution was absorbed by the resin and recovered upon regenerating the resin. The concentration of cobalt in the eluant was about 5 times that of the original solution.

EXAMPLE VI

The effect of varying pH of the nickel containing solution on the absorption rate was determined using Duolite A–2 anion exchange resin. The resin (10 grams) was contacted with a leach solution from an ore containing 10 grams of nickel per liter for sufficient time to achieve equilibrium. The resin was washed and then stripped free of nickel with a dilute solution of sulfuric acid. Analysis of strip solutions obtained where the absorption occurred at different pH values were as follows:

Initial pH of nickel solution: Percent nickel absorbed
3.5 ---------------------------------------- 2
4.5 ---------------------------------------- 25
5.3 ---------------------------------------- 61
5.5 ---------------------------------------- 65

The above data demonstrates the advantage of adding sufficient caustic during the absorption or percolation step to maintain the pH of the aqueous solution above 5.0. This is the preferred practice in accordance with the present invention.

EXAMPLE VII

To determine the effect of relatively high iron concentrations on the absorption of metals capable of forming ammonia complexes with weak base anion exchange resin, a run was made on a solution containing 5 grams of nickel per liter and 5 grams of ferric iron per liter. This solution was contacted with 25 grams of Amberlite IR–4B weak base anion exchange resin until the resin was loaded. The loaded resin was washed and then regenerated with a dilute solution of sulfuric acid to produce a concentrated green colored nickel strip solution. Analysis of the strip solution showed it contained less than 2% iron.

EXAMPLE VIII

A zinc solution (1 gm. of zinc per liter) was adjusted to pH 4.5 with lime and percolated through one foot column packed with Duolite A–2 anion exchange resin. The effluent from this column was substantially zinc free until the resin became loaded with zinc and break through occurred. When break through occurred, the column was washed and then eluted with a small volume of 5% sulfuric acid. Analysis of the eluant showed the zinc concentration to be increased several fold. The regenerated resin was put back into service by feeding the zinc solution to the column. After 15 cycles, the performance of the resin was substantially unchanged.

EXAMPLE IX

An acidic mine water containing 0.3 g./l. of zinc, 3 g./l. of iron, together with miscellaneous other impurities, was adjusted to a pH of 5.0 with lime. The suspended and flocced solids produced upon adjusting the pH were allowed to settle. The supernatant liquid (5 gallons) was contacted with Amberlite IR–45 anion exchange resin (0.1 pound) over a period of four hours. The pH of the supernatant liquid dropped during the contact period.

The resin was separated from the supernatant liquid, washed with distilled water and eluted with dilute nitric acid. Analysis of the eluant indicated that 75% or more of the zinc in the mine water had been recovered.

Neutralization of the eluant with soda ash yielded a zinc hydroxide gel which, upon drying and calcining, was of suitable grade for feeding to a zinc reduction retort.

What is claimed is:

1. A hydrometallurgical process for concentrating metal values comprising contacting an aqueous solution containing cations of at least one metal selected from the class consisting of cobalt, nickel, copper, and zinc with a water-insoluble, solid, weak base amine resin capable of forming a metal amine complex with the metal to be concentrated, the metal values being absorbed by the resin and the aqueous solution having a pH of at least about 3.0 but less than the pH at which a metal containing compound selected from the class consisting of the hydroxides and basic salts of cobalt, nickel, copper and zinc is precipitated therefrom.

2. The process of claim 1 wherein the aqueous solution contains cobalt values.

3. The process of claim 1 wherein the aqueous solution contains nickel values.

4. The process of claim 1 wherein the aqueous solution contains copper values.

5. The process of claim 1 wherein the aqueous solution contains zinc values.

6. A hydrometallurgical process for concentrating metal values comprising contacting an aqueous solution containing cations of at least one metal selected from the class consisting of cobalt, nickel, copper and zinc with a water-insoluble, solid, weak base amine resin capable of forming a metal amine complex with the metal to be concentrated, the metal values being absorbed by the resin and the aqueous solution having a pH of at least about 5.0 but less than the pH at which a metal containing compound selected from the class consisting of the hydroxides and basic salts of cobalt, nickel, copper and zinc is precipitated therefrom.

7. The process of claim 6 wherein the aqueous solution contains cobalt values.

8. The process of claim 6 wherein the aqueous solution contains nickel values.

9. The process of claim 6 wherein the aqueous solution contains copper values.

10. The process of claim 6 wherein the aqueous solution contains zinc values.

11. A hydrometallurgical process for concentrating metal values comprising contacting an aqueous solution containing cations of at least one metal selected from the class consisting of cobalt, nickel, copper and zinc with a water-insoluble, solid, weak base anion exchange resin, the metal values being absorbed by the resin and the pH of the aqueous solution being at least 3.0 and less than the pH at which a metal containing compound selected from the class consisting of the hydroxides and basic salts of cobalt, nickel, copper and zinc is precipitated therefrom.

12. The process of claim 11 wherein the aqueous solution contains cobalt values.

13. The process of claim 11 wherein the aqueous solution contains nickel values.

14. The process of claim 11 wherein the aqueous solution contains copper values.

15. The process of claim 11 wherein the aqueous solution contains zinc values.

16. A hydrometallurgical process for concentrating metal values comprising contacting an aqueous solution containing cations of at least one metal selected from the class consisting of cobalt, nickel, copper and zinc with a water-insoluble, solid, weak base anion exchange resin, the metal values being absorbed by the resin and the pH of the aqueous solution being at least 5.0 and less than the pH at which a metal containing compound selected from the class consisting of the hydroxides and basic salts of cobalt, nickel, copper and zinc is precipitated therefrom.

17. The process of claim 16 wherein the aqueous solution contains cobalt values.

18. The process of claim 16 wherein the aqueous solution contains nickel values.

19. The process of claim 16 wherein the aqueous solution contains copper values.

20. The process of claim 16 wherein the aqueous solution contains zinc values.

References Cited in the file of this patent

UNITED STATES PATENTS

| | | |
|---|---|---|
| 2,628,165 | Bliss | Feb. 10, 1953 |
| 2,831,763 | Nashner et al. | Apr. 22, 1958 |

OTHER REFERENCES

Ion Exchange Technology, edited by Nachod, F. C. et al., 1956, Academic Press, Inc., pp. 291–300; 1949, pp. 244–245.

Samuelson: "Ion Exchangers in Analytical Chemistry," John Wiley and Sons, Inc., 1953, pp. 23–25.